United States Patent Office 3,096,357
Patented July 2, 1963

3,096,357
NOVEL REACTION PRODUCTS OF A SULFURIC ACID AND EPOXIDES
Jürgen Plapper, Dusseldorf, and Gerhard Dieckelmann, Dusseldorf-Holthausen, Germany, assignors to Böhme Fettchemie G.m.b.H., Dusseldorf, Germany, a corporation of Germany
No Drawing. Filed Apr. 12, 1961, Ser. No. 102,387
Claims priority, application Germany May 4, 1960
13 Claims. (Cl. 260—400)

The invention relates to novel light-colored, surface active products formed by the reaction of polybasic inorganic acids with epoxides of high molecular weight unsaturated compounds and the salts thereof. The invention also relates to a process for the preparation of said surface active products. The invention further relates to a process for removing odors and sedimentations from train oils.

Epoxides of high molecular weight unsaturated compounds are known to polymerize into higher molecular weight products having the character of lubricants or fatice-type substances in the presence of acids such as sulfuric acid. It is surprising that the said epoxides behave entirely different under the conditions of the present process and only form monomeric ester products with the poly basic mineral acids.

The surface active products of the invention are superior to the products obtained by the reaction of poly basic mineral acid with high molecular weight unsaturated compounds in light fastness due to the lower iodine number. Also the products of the invention have a clearly visible bleaching effect.

It is an object of the invention to provide novel surface-active products formed by the reaction of polybasic inorganic acids with epoxides of high molecular weight unsaturated compounds and the salts of said products.

It is a further object of the invention to provide a novel process for the preparation of surface-active agents.

These and other objects and advantages of the invention will become obvious from the following detailed description.

The process for the preparation of the surface active products of the invention comprises reacting the epoxide of a high molecular weight unsaturated compound with 8 to 20% by weight of a polybasic mineral acid or derivative thereof at temperatures below 40° C. and recovering the surface active product. If the water soluble salts are desired the reaction product may be neutralized with a suitable organic or inorganic base and the salt of the surface-active product may be recovered. When sulfuric acid is used, the conditions are the normal sulfonation conditions.

The epoxides of the high molecular weight unsaturated compounds used as starting materials are known and are obtained by the known methods such as by reaction with hydrogen peroxide in the presence of acetic acid. The high molecular weight unsaturated compounds are unsaturated hydrocarbons, alcohols, ethers, esters, carboxylic acids, amides and the like having 8 or more carbon atoms, preferably 10 to 20 carbon atoms per unsaturated lipophilic radical in the molecule, and may be aliphatic, aromatic or heterocyclic.

The starting epoxides may be derived from olefins such as octene, dodecene, octadecene and squalene and unsaturated high molecular weight alcohols such as fatty alcohols containing 14 to 20 carbon atoms like oleyl alcohol esterified with a mono or poly carboxylic acid as well as the ethers of said alcohols.

The epoxides may be derived from esters and amides of unsaturated high molecular weight fatty acids such as primarily naturally occurring glycerides whose fatty acid moiety may be mono- or polyunsaturated, such as soybean oil, cottonseed oil, rape oil, linseed oil, castor oil, sunflower seed oil, olive oil, neat's foot oil, and unsaturated waxes and train oils such as sperm oil, herring oil, codliver oil, shark oil and whale oil, and their esterification products. Further suitable epoxides are derived from esters of unsaturated fatty acids with mono- or polyvalent alcohols of the aliphatic, cycloaliphatic, aromatic or heterocyclic series, such as esters of ethyl, n-butyl, tertiary amyl, 2-ethylhexyl, octadecyl, cyclohexyl, methylcyclohexyl, naphthanyl, and benzyl alcohols or of alkanediols such as ethylene glycol, 1,2-propylene glycol, butanediol-1,4, dodecanediol-1,12, alkanepolyols such as pentaerythrite, and polyalkylene glycols such as diethylene glycol. Also epoxidation products of esters of unsaturated carboxylic acid and alcohol mixtures as well as of mixed esters of polyvalent alcohols with various unsaturated carboxylic acids, such as the mixed ester of ethylene glycol with oleic acid and linseed fatty acid, may be used. Furthermore, epoxides of esters may also be used in which the acids moiety as well as the alcohol moiety contain a mono- or polyunsaturated hydrocarbon radical. Finally, the starting materials may also be epoxides of esters or amides of unsaturated carboxylic acids or alcohols with are obtained by condensation of high molecular weight unsaturated fatty acids or fatty alcohols of the above indicated type with low molecular, polybasic carboxylic acids, such as maleic acid, citric acid, adipic acid, phthalic acid, etc., and/or polyvalent alcohols, such as glycols, glycerine, pentaerythrite, sorbitol, etc. The epoxidation products of amides may, for example, be based upon unsaturated fatty acid amides which are derived from ammonia, dimethylamine, dodecylamine, oleylamine, ethylenediamine, cyclohexylamine, benzylamine, etc.

Also, the epoxidate of epoxidizable compounds of a nonaliphatic character may be used as starting materials, especially those of unsaturated cycloaliphatic or heterocyclic compounds, such as epoxidation products of tetrahydrobenzoic acid and tetrahydrophthalic acid derivatives or condensation products according to Diels-Alder from diene components with at least two conjugated double bonds and philodiene components with at least one unsaturated bond as well as sterols, such as cholesterol.

The epoxide oxygen content of the fats, oils and waxes used as starting materials may be as high as 3% and the iodine number, about 80 to 50% of the original value. Particularly valuable products are obtained when the starting material is only partially expodized and has an epoxide oxygen content of 0.5 to 1.5%. With the more unsaturated compounds such as the train oils, an epoxide oxygen content of 0.5 to 1.0% is preferred while an epoxide oxygen content of 1.0 to 1.5% is preferred with less unsaturated compounds such as tri-olecic acid ester of glycerine (olein), the cetyl ester of oleic acid, neats foot oil, grape oil and the like.

The fats, oils and waxes before epoxidation may be relatively low grade dark colored as the epoxides formed from said materials are light in color and have a pleasant odor. This is especially true of train oils or waxes. The surface-active products of the invention have a light color and a weak odor, if any.

Polyvalent inorganic acids which are suitable for the process of the invention include boric acid, sulfuric acid, or other sulfonating agents, such as sulphur trioxides, oleum, pyridine-sulfuric acid adducts, as well as phosphoric acid, phosphorous pentoxide, anhydrous phosphoric acids, etc.

The reaction of the polybasic inorganic acids with the epoxide starting material may be carried out in stirring vessels or kneading machines depending upon the consistency of the reaction mixture. Inert organic solvents such as carbon tetrachloride, sulfur dioxide, etc. may be used if desired. The reaction occurs at the epoxide group and if the compound is not fully epoxidized, the inorganic acid will also react at any remaining double bonds if there is sufficient acid present.

The reaction is usually carried out at temperatures below 40° C., preferably between 15° to 35° C. Since the reaction is usually exothermic, heat has to be removed from the reaction mixture to prevent side reactions leading to resinous products. The reaction is usually complete after the exothermic action has subsided, but it is advantageous to stir the reaction mixture for a few additional hours to insure complete reaction.

After completion of the reaction, excess inorganic components are removed in the conventional means such as by washing. If it is desired to obtain the salts of the surface active products, the reaction mixture may be partially or completely neutralized with an organic or inorganic base. Examples of suitable bases are alkali metal bases such as sodium hydroxide, potassium hydroxide and sodium carbonate, ammonia, aliphatic amines having from 1 to 6 carbon atoms such as dimethylamine, triethanol amine, etc.

The products of the invention have a lower salt content than when the non-epoxidized starting materials are treated with polybasic acids and therefore have a greater storage stability and no inorganic salts precipitate. The surface active products obtained are readily dispersible in water. They may be employed for all those purposes for which surface active substances are normally used, that is, as wetting agents, dispersing agents, emulsifying agents, and cleaning agents. Furthermore, they may be compounded with other surface active agents and customary organic or inorganic additives to prepare therefrom solid compositions, such as powders, flakes, shavings, chips or chunks.

The sulfonated, phosphorated or borated reaction products thus obtained or their salts are of manifold technical interest. In view of their emulsifying and dispersing properties they may be employed in textile, leather, washing or cleaning industries as active washing agents; cleaning reinforcers; finishing, lubricating and sizing agents; as agents for imparting antistatic properties to fiber material, fabric and foils; in a synthetic industry as emulsifiers; and in petroleum chemistry as lubricants or lubricant additives for lowering the setting point of mineral oils.

The surface active products wherein the epoxide of the unsaturated compound had chain lengths of 10 to 14 carbon atoms have excellent wetting properties and if the claim length of the unsaturated compounds are 12 to 20 carbon atoms the surface active products have good washing and cleaning properties. Surface active products which have chain lengths of 12 to 14 carbon atoms in the unsaturated portion of the molecule are preferred.

With regard to the above described process it is a further advantage of this invention that the reaction between the epoxidized compounds and the polybasic inorganic acids proceeds much easier than the reaction between the nonepoxidized compounds and the said polybasic acids. Furthermore in performing the process of the invention it is possible to use in general smaller amounts of the polybasic inorganic acids. One obtains products of a good water emulsifiability even in applying small amounts of sulfuric acid. On the other hand hardly sulfating unsaturated fatty substances such as oils may be sulfated much better even by small amounts of sulfuric acid if they are partially epoxidized before.

In the following examples there are described several preferred embodiments to illustrate the invention. However, it should be understood that the invention is not intended to be limited to the specific embodiments.

Example I

A black waste herring oil with an unpleasant odor having the characteristic values: acid number=17.2, iodine number=106.9, saponification number=120, hydroxyl number=21.9, was epoxidized with hydrogen peroxide in the presence of acetic acid. After working up the reaction mixture, a light yellow, weakly odorous fish oil was obtained which had the characteristic values: acid number=15.7, iodine number=70.7, epoxide oxygen content=1.0%.

The epoxidized fish oil was sulfonated with 20% by weight of concentrated sulfuric acid at 25–28° C. Thereafter, the reaction mixture was stirred for about 2 hours at the same temperature. The acid sulfonation product thus obtained was washed twice with a 10% sodium sulfate solution. Thereafter, it was neutralized by adding potassium hydroxide. The reaction product thus obtained was a clear, yellowish, oil-free liquid which was readily dispersible in water.

Example II

A dark brown, deacidified whale oil having the characteristic values: acid number=2.0, saponification number=154.8, hydroxyl number=17, iodine number=132.5, was epoxidized as described in Example I. The light color whale oil epoxide thus obtained after the epoxidation (acid number=0, saponifaction number=155.2, hydroxyl number=19, iodine number=84.0, epoxide oxygen content=1.3%) was sulfonated with 15% by weight of concentrated sulfuric acid, stirred and washed under the conditions indicated in Example I. The acid oil thus obtained was adjusted to a pH of 6.5 by adding triethanolamine. Upon stirring this product into 10 times its volume of water a stable emulsion was obtained which remained stable over a long period of time.

Example III 500 parts by weight of an epoxidized fish oil (epoxide oxygen content 0.5%, iodine number=98.9, acid number=36.1) were reacted with 100 parts by weight of concentrated phosphoric acid accompanied by cooling and vigorous mechanical stirring. The phosphoric acid was added in small portions over a period of 3 hours at a temperature of 18° C. After all of the phosphoric acid had been added, the reaction mixture was stirred for one additional hour. Thereafter, the phosphated fish oil was introduced in small portions into 115 parts by weight of an about 20% solution of potassium hydroxide, accompanied by thorough cooling (about 14–16° C.) and stirring.

A viscous emulsion was obtained from which the water was distilled in vacuo (about 40 mm. mercury) at 70–80° C. Upon prolonged standing the inorganic portions of the reaction product crystallized out and were separated. The phosphorated reaction product thus obtained was an ointment-like mass which was readily emulsifiable with water.

Example IV

A soybean oil having the characteristic values: acid number=0.1, saponification number=187, iodine number=120, was reacted in known fashion with less than stoichiometric amounts of hydrogen peroxide and acetic acid until the epoxidate had an epoxide oxygen content of 1.5% with an acid number=0.17 and an iodine number=80.5.

The epoxidate thus obtained was sulfonated with 20% by weight of concentrated sulfuric acid at 25–28° C. After stirring the reaction mixture it was washed with a solution of sodium sulfate. The sulfonation product thus obtained was adjusted to a pH value of 6.5 with concentrated aqueous ammonia. The neutralization product was a light colored, water-soluble oil.

Example V

An epoxidized soybean fatty acid morpholide having the characteristic values: iodine number=68.1, epoxide oxygen content=1.6%, was heated at 15° C. with 10% by weight of concentrated phosphoric acid. The acid phosphorated reaction product was neutralized with a 10% potassium hydroxide solution. An ointment-like, highly viscous reaction product was obtained which was miscible with water and formed a stable emulsion.

*Example VI*

A light yellow fish or herring oil having the characteristic values: iodine number=70, saponification number=180, and epoxide oxygen content=0.7%, was sulfated with 13% by weight of 96% sulfuric acid at 25° C. The sulfuric acid was added over a period of about one hour and the reaction mixture was stirred for another hour to an hour and a half. Without delay, the acid ester was then continuously allowed to run about 80% of the stoichiometrically required amount of ammonia for complete neutralization, which was provided in the form of 5% solution. A maximum temperature of 30° C. was not exceeded during that time. The reaction mixture was then allowed to stand at about pH 4 to 5 and at a temperature of about 50° C. for 10 to 12 hours until the salt water layer separated.

After separating the aqueous layer, the reaction product was completely neutralized by adding a 25% ammonia solution until the pH was 6.8 to 7.0. Consumption per 100 kg. of epoxidized oil:

13 kg. of 96% sulfuric acid
About 75 kg. of 5% ammonia solution
About 2 kg. of 25% ammonia.

A brown, clean sulfonate was obtained which formed stable emulsions with water and may be employed as a light stable leather fatting agent, especially for high quality, pastel colored types of leather.

*Example VII*

A yellow shark oil having the characteristic values: iodine number=70, saponification number=155, and epoxide oxygen content=1.0% was sulfated with 18% of 96% sulfuric acid. The sulfuric acid was added over a period of 1½ to 2 hours at a maximum temperature of 28° C. The reaction mixture was stirred for an additional hour to hour and a half. Without delay, the acid ester was stirred into about 80% of the amount of alkali required for complete neutralization in the form of a 5–10% potassium hydroxide solution. The temperature was not allowed to exceed 30–35° C. After the acid ester had been stirred in, the mixture had a pH value of 4 to 5. The aqueous layer was separated after 2 to 4 hours of standing. The supernatant oil was neutralized with a 50% potassium hydroxide solution until the pH was 6.8 to 7.0. A light brown, clear sulfonate was obtained which may be employed as a light stable leather fatting agent.

*Example VIII*

60 parts of the sulfonate prepared in Example VII and 40 parts of paraffin oil (5° E. at 20° C.) yield a clear, water-emulsifiable mineral oil mixture. These emulsions are very stable and may be employed as textile agents, fluxes and preparation agents.

*Example IX*

A light yellow sperm oil epoxide having the characteristic values: acid number=0.6, saponification number=140, iodine number=51.7, U.V.=37.2%, and epoxide oxygen content=1.34%, was sulfated with 15% of 96% sulfuric acid at 28–30° C. The sulfuric acid was stirred in over a period of about 2 hours and the reaction mixture was stirred for an additional hour and a half. The acid ester was stirred into about 80% of the amount of ammonia required for complete neutralization, in the form of a 5% solution (consumption per 100 kg. of oil; about 55 kg. of 5% ammonia solution). The temperature was not permitted to rise above 30–35° C. Upon standing for 8 to 10 hours, the salt water layer separated and the supernatant sulfonate was completely neutralized with 25% ammonia until the pH was 6.8 to 7.0 (consumption about 3 to 3.5 kg. of 25% ammonia). A brown, clear sulfonate was obtained which was useful as a light stable leather fatting agent for light colored types of leather.

*Example X*

Oleic acid decylester having the characteristic values: acid number=0.4, iodine number=33.5, and epoxide oxygen content=1.32%, was sulfated with 20% by weight of 96% sulfuric acid at 28° C. The sulfuric acid was added over a period of 2½ hours and the reaction mixture was stirred for about 1½ hours. Washing and neutralization of the sulfonate was accomplished as described in Example IX. A water-emulsifiable, strongly wetting, brownish yellow, clear oil was obtained in this manner which was useful as a wetting agent and fiber protective agent in the preparation of textiles and leather.

*Example XI*

A rape oil having the characteristic values: acid number=0.3, iodine number=103.2, saponification number=175.4, and hydroxyl number=2.8, was epoxidized as in Example I. The product had the following characteristic values: acid number=0.3, iodine number=80.2, and epoxide oxygen content=1.54%. This epoxidized, light yellow rape oil was sulfated with 8% by weight of sulfuric acid at 28–30° C. within one hour. After addition of all the sulfuric acid, the reaction mixture was stirred for 1 to 1½ hours.

About 80% of the required neutralization agent were placed into a stirring vessel in the form of a 5% ammonia solution. While cooling slightly, the acid ester was slowly stirred into the ammonia solution so that the temperature did not rise above 30° C. The resulting mixture was allowed to stand for about 10 to 12 hours at a pH between 4.0 and 5.0 and at a temperature of about 50° C., and then the salt water layer which separated was removed. The sulfonation product was neutralized with ammonia to a pH of 7.0 to 7.5. A clear oil was obtained which was easily emulsifiable in water. The sulfonation product thus obtained was useful as a light stable fatting agent in the preparation of pastel and light leather. It was used in the customary amount of 4–6%, based on the weight of the leather.

Various modifications of the process and products of the invention may be made without departing from the spirit or scope thereof, and it is to be understood that the invention be limited only as defined in the appended claims.

We claim:

1. A process for the preparation of surface-active sulfuric acid reaction products which comprises reacting at temperatures between about 15° and 40° C. an epoxide of high molecular weight unsaturated polyesters having at least one unsaturated hydrocarbon radical with 8 to 20 carbon atoms and having an epoxide oxygen content of 0.5 to 1.5% and 8 to 20% by weight sulfuric acid and recovering the reaction product.

2. The process of claim 1 wherein the reaction product is neutralized with a base to form the salt of the reaction product and recovering the said salt.

3. A process for the preparation of sulface-active reaction products which comprises reacting a train oil having an epoxide oxygen content of 0.5 to 1.0% with 8 to 20% by weight of sulfuric acid at temperatures between about 15° to about 40° C. and recovering said product.

4. A process for the preparation of sulface-active reaction products which comprises reacting a compound selected from the group consisting of epoxides of unsaturated animal oil, unsaturated fish oil and unsaturated vegetable oil having an epoxide oxygen content of 1.0 to 1.5% with 8 to 20% by weight of sulfuric acid at temperatures between about 15° and about 40° C. and recovering the surface-active reaction product.

5. A process for the preparation of surface-active reaction products which comprises reacting an epoxide of the decylester of oleic acid having an epoxide oxygen content of 1.0 to 1.5% with 8 to 20% by weight of sulfuric acid at a temperature about 15° and 40° C., neutralizing the reaction product to form the salt thereof and recovering the surface-active salt.

6. The process of claim 1 wherein the said epoxide has 12 to 14 carbon atoms in said unsaturated portion of the molecule.

7. The process of claim 3 wherein the reaction product is neutralized with a base to form the salt of said reaction product and recovering the surface-active salt.

8. The process of claim 4 wherein the reaction product is neutralized with a base to form the salt of the said reaction product and recovering the surface-active salt.

9. The product produced by the process of claim 1.
10. The product produced by the process of claim 6.
11. The product produced by the process of claim 3.
12. The product produced by the process of claim 4.
13. The product produced by the process of claim 5.

References Cited in the file of this patent

UNITED STATES PATENTS

| | | |
|---|---|---|
| 1,926,769 | Hailwood et al. | Sept. 12, 1933 |
| 2,965,657 | Findley | Dec. 20, 1960 |

OTHER REFERENCES

BECCO, Catalog Bulletin No. 69, page 42, published by Becco Chemical Div. of Food Machinery & Chemical Corp., Buffalo 7, N.Y.

E. I. Dupont de Nemours, Epoxidation & Hydroxylation Catalog, page 6.

Nicolet et al.: J. Am. Chem. Soc. 52, 1186–1191 (1930).

Markley: Fatty Acids, page 419, 1947 edition.

Gall et al.: J. Am. Oil Chemists Soc. 34, 161–164 (1957).